(12) United States Patent
Caine

(10) Patent No.: US 8,725,437 B2
(45) Date of Patent: May 13, 2014

(54) SYSTEM AND METHOD FOR MONITORING PERFORMANCE OF A PHOTOVOLTAIC ARRAY

(75) Inventor: Holden R. Caine, Boulder, CO (US)

(73) Assignee: Also Energy, LLC, Boulder, CO (US)

( * ) Notice: Subject to any disclaimer, the term of this patent is extended or adjusted under 35 U.S.C. 154(b) by 397 days.

(21) Appl. No.: 13/253,154

(22) Filed: Oct. 5, 2011

(65) Prior Publication Data

US 2012/0084027 A1    Apr. 5, 2012

Related U.S. Application Data

(60) Provisional application No. 61/390,176, filed on Oct. 5, 2010.

(51) Int. Cl.
*G01R 31/00* (2006.01)
(52) U.S. Cl.
USPC .......................................................... 702/58

(58) Field of Classification Search
USPC .......................................................... 702/58
See application file for complete search history.

(56) References Cited

U.S. PATENT DOCUMENTS

| | | | |
|---|---|---|---|
| 5,712,572 A | 1/1998 | Tamechika et al. | |
| 2002/0059035 A1 * | 5/2002 | Yagi et al. | 702/59 |
| 2009/0222224 A1 | 9/2009 | Lewis et al. | |
| 2011/0210610 A1 | 9/2011 | Mitsuoka et al. | |

* cited by examiner

*Primary Examiner* — Stephen Cherry
(74) *Attorney, Agent, or Firm* — Sheridan Ross PC

(57) ABSTRACT

The present disclosure provides a system and method for monitoring performance of a photovoltaic array. The system and method reduces the need for monitoring equipment by collecting measurement data associated with a plurality of photovoltaic strings. Failure and performance degradation detection is improved through the use of monitoring conditions, performance thresholds, and auto-calibration. Various user interfaces enable a user to modify or adjust the monitoring system and method, as well as monitor the performance of a photovoltaic array.

20 Claims, 10 Drawing Sheets

SYSTEM AND METHOD FOR MONITORING PERFORMANCE OF A PHOTOVOLTAIC ARRAY

CROSS REFERENCE TO RELATED APPLICATION

The present application claims the benefit of and priority, under 35 U.S.C. §119(e), to U.S. Provisional Application Ser. No. 61/390,176, filed Oct. 5, 2010, entitled "SYSTEM AND METHOD FOR DETECTING FAILURES AND PERFORMANCE DEGRADATION IN A PHOTOVOLTAIC ARRAY," which is incorporated herein by this reference in its entirety.

FIELD

The present disclosure relates to systems and methods for the real-time processing of data, and more particularly, to a system and method for detecting failures and performance degradation in a photovoltaic array.

BACKGROUND

In a photovoltaic ("PV") system, solar panels are organized into an array of strings. Typically, each string contains the same number of panels as all other strings. The strings are connected together in parallel to produce the desired voltage and current necessary for efficient DC to AC conversion.

In any large array of identical elements, single points of failure are common and must be detected so that corrective action can be taken to insure that all elements in the array are producing power. In addition to sudden failures, performance may degrade for a variety of reasons, such as soiling or a partial panel failure. One common solution to this problem is to measure the current produced by each string. However, for large commercial and utility scale arrays containing thousands of solar panels, individually measuring the current of each string requires a significant capital investment in hardware and related construction costs. Thus, there is a need for a system and method for detecting failures and performance degradation in a photovoltaic array that reduces the upfront capital investment while providing comparable accuracy.

SUMMARY

In accordance with the present disclosure, a PV array monitoring system and method are provided that requires considerably less hardware than existing systems while providing a nearly identical ability to identify failures within the array. Additionally, the system and method described herein may be employed to detect performance degradation so that further analysis can be applied to determine the root cause.

In at least one embodiment, a monitoring system comprises a data processing system in which information is gathered on the performance of a PV array, and the data processing system analyzes the data to determine whether an alert should be generated. The system reduces the capital cost of implementing a monitoring system by reducing the measurement hardware required in the field. This is accomplished by measuring the performance of a plurality of PV strings and by employing the monitoring system and method disclosed herein. By measuring the performance of a plurality of PV strings, the quantity of measurement hardware, and thus the cost, is reduced. Typically, measuring the performance of more than one PV string resulted in a decreased ability to detect failures and performance degradation. However, utilizing the system and method disclosed herein, the monitoring system can achieve sensitivity levels consistent with existing monitoring systems that employ measurement hardware at the individual string level.

In at least one embodiment, a monitoring system is provided that comprises measurement hardware, an analysis engine, and a database for storing monitoring conditions, performance thresholds, performance data, and analysis data. The monitoring system gathers data for a plurality of strings, analyzes the data, and provides a user interface that allows a user to monitor the performance of a PV array. The user has the option to view performance data at all levels of an array.

In accordance with at least another embodiment, a monitoring system includes a memory, a processor in connection with the memory, and a web application operable to receive user-selectable monitoring conditions and to display performance data associated with a data entry. In this embodiment, the processor is operable to execute software modules comprising: a filtering module operable to determine if a data entry should be monitored based upon monitoring conditions, wherein the data entry is associated with a plurality of photovoltaic strings; a performance module operable to compare the data entry with a performance threshold comprising both a channel-to-channel comparator and a time-differential comparator; and an alert module operable to generate an alert associated with the data entry.

In at least one embodiment, a monitoring method comprises a process of collecting data associated with a plurality of PV strings, filtering the data, comparing the data to performance thresholds, and generating an alert if the data channel is underperforming. The method increases failure detection sensitivity by removing noise from the data, such as cloud or obstacle shading. Additionally, the method increases performance degradation detection sensitivity by comparing the performance of a plurality of PV strings with the performance of another plurality of PV strings and/or comparing historical performance data.

In accordance with at least another embodiment, a monitoring method comprises: receiving a data entry associated with a plurality of photovoltaic strings; determining, via a processor, whether the data entry should be analyzed based upon monitoring conditions; determining, via a processor, if the data entry is within a performance threshold comprising both a channel-to-channel comparison and a time-differential comparison; in response to a determination that the data entry should be analyzed and that the data entry is not within the performance threshold, determining, via a processor, if the data entry has been in an alarm condition for a predetermined period of time; and in response to a determination that the data entry has been in an alarm condition for a predetermined period of time, generating an alert in the form of at least one of a user interface, a printed report, a text message, or an email message.

The present disclosure can provide a number of advantages depending on the particular aspect, embodiment, and/or configuration. As mentioned above, the system and method disclosed herein enable a user to monitor a PV system with reduced measurement hardware while maintaining the sensitivity necessary to reliably detect string failures and performance degradation. Additionally, with respect to the analysis provided by the present disclosure, the system and method disclosed herein allows a user or automated system to make timely decisions as to how to cost-effectively operate photovoltaic arrays. For example, during periods in which operator personnel are not typically working, the user can reduce overtime costs by increasing a production impact performance threshold, thereby reducing alert generation. These and other advantages will be apparent from the disclosure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium", as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "data channel", as used herein, is associated with a sensor and the individual data entries detected by the sensor. As shown in FIG. 3, sensor 1 is associated with a first data channel, sensor 2 is associated with a second data channel, and sensor 3 is associated with a third data channel. Each data channel is associated with the individual data entries detected by the respective sensors.

The term "desktop", as used herein, refers to a metaphor used to portray systems. A desktop typically includes pictures, called icons, that show applications, windows, cabinets, files, folders, documents, and other graphical items. The icons are generally selectable through user interface interaction to allow a user to execute applications or conduct other operations.

The term "display", as used herein, refers to a portion of a screen used to display the output of a computer to a user.

The term "displayed image", as used herein, refers to an image produced on the display. A typical displayed image is a window or desktop. The displayed image may occupy all or a portion of the display.

The term "module", as used herein, refers to any known or later developed hardware, software, firmware, artificial intelligence, fuzzy logic, or combination of hardware and software that is capable of performing the functionality associated with that element.

The term "window", as used herein, refers to a, typically rectangular, displayed image on part of a display that contains or provides content different from the rest of the screen.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

Other features and advantages of the present disclosure will become apparent from a review of the following detailed description, taken in conjunction with the drawings.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following detailed description describes one or more embodiments of the disclosed system and method. First, the detailed description provides a description of a network system and a computer system that may be used in connection with the monitoring system and method disclosed herein. The detailed description then provides a disclosure of embodiments of the monitoring system and method disclosed herein. The detailed description further provides various user interfaces or outputs generated by the monitoring system and method disclosed herein.

Figure 1:
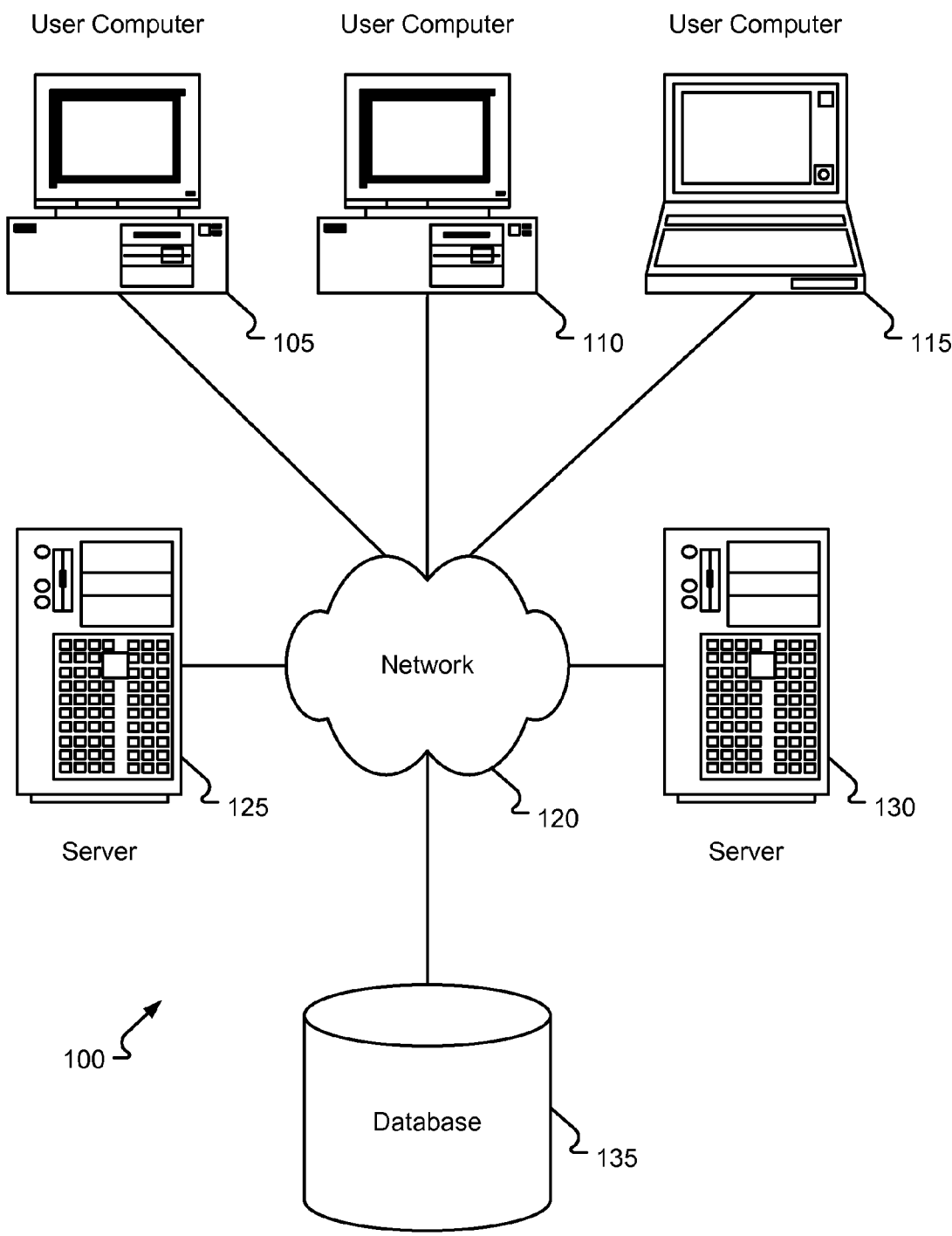
FIG. 1 is an example communications/data processing network system that may be used in conjunction with embodiments of the present disclosure.

Referring to FIG. 1, an example network system is provided that may be used in connection with the monitoring system and method disclosed herein. More specifically, FIG. 1 illustrates a block diagram of a system 100 that may use a web service connector to integrate an application with a web service. The system 100 includes one or more user computers 105, 110, and 115. The user computers 105, 110, and 115 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110, 115 may also have any of a variety of applications, including for example, database client and/or server applications, and web browser applications. Alternatively, the user computers 105, 110, and 115 may be any other electronic device, such as a thin-client computer, Internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers may be supported.

System 100 further includes a network 120. The network 120 may be any type of network familiar to those skilled in the art that can support data communications using any of a variety of commercially-available protocols, including without limitation TCP/IP, SNA, IPX, AppleTalk, and the like. Merely by way of example, the network 120 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 125, 130. One server may be a web server 125, which may be used to process requests for web pages or other electronic documents from user computers 105, 110, and 120. The web server can be running an operating system including any of those discussed above, as well as any commercially-available server operating systems. The web server 125 can also run a variety of server applications, including HTTP servers, FTP servers, CGI servers, database servers, Java servers, and the like. In some instances, the web server 125 may publish operations available as one or more web services.

The system 100 may also include one or more file and/or application servers 130, which can, in addition to an operating system, include one or more applications accessible by a client running on one or more of the user computers 105, 110, 115. The server(s) 130 may be one or more general purpose computers capable of executing programs or scripts in response to the user computers 105, 110 and 115. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 130 may also include database servers, including without limitation those commercially available from Oracle, Microsoft, Sybase™, IBM™ and the like, which can process requests from database clients running on a user computer 105.

In some embodiments, an application server 130 may create web pages dynamically for displaying the development system. The web pages created by the web application server 130 may be forwarded to a user computer 105 via a web server 125. Similarly, the web server 125 may be able to receive web page requests, web services invocations, and/or input data from a user computer 105 and can forward the web page requests and/or input data to the web application server 130.

In further embodiments, the server 130 may function as a file server. Although for ease of description, FIG. 1 illustrates a separate web server 125 and file/application server 130, those skilled in the art will recognize that the functions described with respect to servers 125, 130 may be performed by a single server and/or a plurality of specialized servers, depending on implementation-specific needs and parameters.

The system 100 may also include a database 135. The database 135 may reside in a variety of locations. By way of example, database 135 may reside on a storage medium local to (and/or resident in) one or more of the computers 105, 110, 115, 125, 130. Alternatively, it may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10i™, that is adapted to store, update, and retrieve data in response to SQL-formatted commands.

Figure 2:
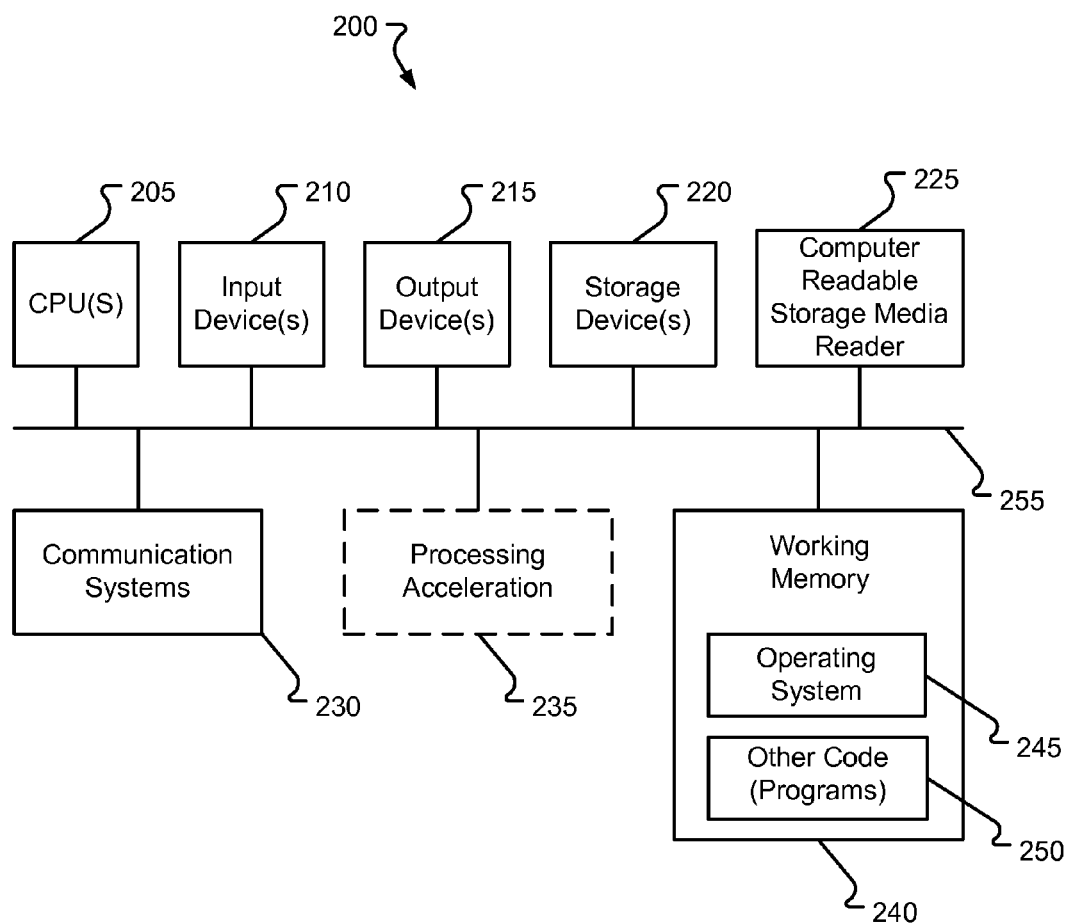
FIG. 2 is an example computer system that may be used in conjunction with embodiments of the present disclosure.

Referring to FIG. 2, an example computer system is provided that may be used in connection with the monitoring system and method disclosed herein. More specifically, FIG. 2 illustrates one embodiment of a computer system 200 upon which a web service connector or components of a web service connector may be deployed or executed. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as program code implementing a web service connector or components of a web service connector. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Figure 3:
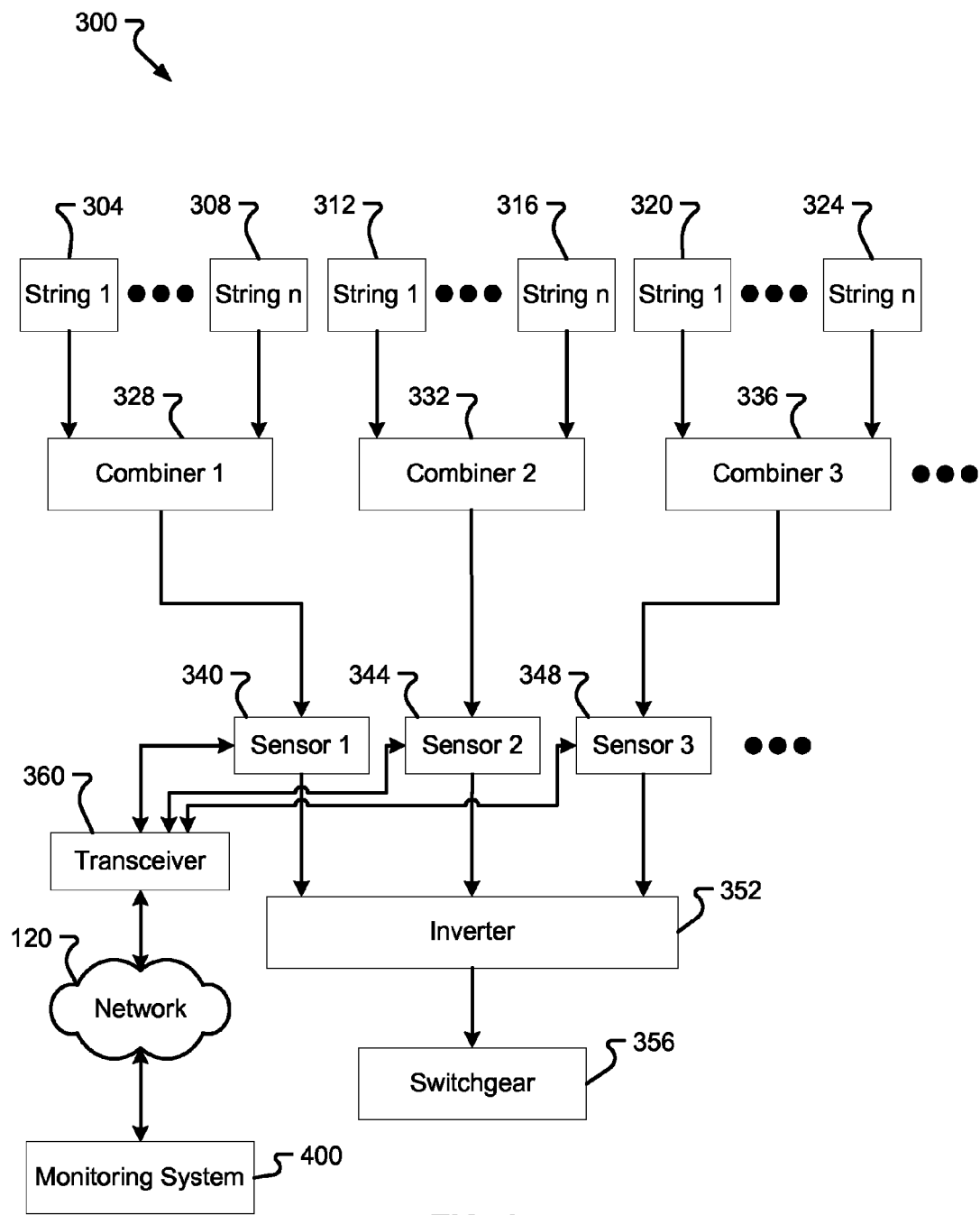
FIG. 3 is a block diagram of a PV system in conjunction with a monitoring system.

FIG. 3 depicts a block diagram of the electrical layout of a PV system 300 that includes a plurality of PV strings 304, 308, 312, 316, 320, 324, a plurality of combiners 328, 332, 336, and an inverter 352. Each PV string consists of individual solar panels, typically eight to twelve panels, wired in series. The output signals of the PV strings are wired, in parallel, into the combiners. For example, in FIG. 3, PV String 1 304 through PV String n 308 are wired into Combiner 1 328, PV String 1 312 through PV String n 316 are wired into Combiner 2 332, and PV String 1 320 through PV String n 324 are wired into Combiner 3 336. Each combiner sums the data signals of their PV strings, thereby providing a cumulative direct current ("DC") power output that is associated with a plurality of PV strings. The output signals of the combiners are wired into an inverter 352. In FIG. 3, only one inverter is illustrated. However, in large PV systems, multiple inverters are employed, each accepting the output signals of multiple combiners. The inverter 352 converts the DC power of the solar panels into three phase alternating current ("AC") power which ultimately can be used by commercial power systems. The three phase AC power leaves the inverter 352 and is wired into the switchgear 356 of the facility where the AC output of the PV system 300 is matched to supply power to the facility or to a utility grid.

As illustrated in FIG. 3, measurement hardware, such as sensors 340, 344, 348, detect the input signals of the inverter 352. In some embodiments, the measurement hardware detects the output signals of the inverter 352. The sensors may be separate from the inverter 352, or the sensors may be incorporated into the inverter 352. By locating the sensors near the inverter 352, the hardware costs, such as the quantity of sensors and associated wiring, is significantly reduced. This is especially important for large PV systems where thousands of strings are employed. In prior systems, the sensors are located near the input of the combiner due to the difficulty of detecting failures and performance degradation in a plurality of PV strings, thus severely increasing the cost of the monitoring system. To further reduce hardware costs, in at least one embodiment, each combiner sums the output of at least six PV strings, and preferably, at least twelve PV strings. This reduces the number of combiners required in a PV system, as well as reduces the number of sensors and associated wiring required to monitor the performance of the PV system. Accordingly, each sensor detects data that is associated with a plurality of PV strings. This data is collected and analyzed to monitor the performance of the PV array.

Prior systems are not able to achieve this reduction in cost because as the combiner sums higher numbers of strings, a single string failure becomes harder to detect. In the ideal case, the signal to noise level can be defined as 1/n, where n is the number of strings in a group. For example, with ten strings per group, a single string failure would result in a ten percent reduction in current at the inverter input. However, the ideal case is not achievable because the signal-to-noise ratio is further reduced due to measurement errors, differences between solar panels, mounting, and environmental conditions such as cloud shading, soiling (dirt on the panels), and obstructions. Embodiments of the present monitoring system and method utilize a number of approaches to compensate for these noise issues, thus enabling the detection of single string failures or performance degradation from a data channel associated with a plurality of PV strings.

Referring back to FIG. 3, the sensors 340, 344, 348 are in communication with a transceiver 360, which transmits the sensor data through the network 120 to the monitoring system 400. The sensor data may be either current or voltage data. Examples of sensors include, but are not limited to, voltage transformers (VT), current transformers (CT), and Hall Effect sensors. As shown in FIG. 3, each sensor is associated with an output signal of a combiner, which is the summation of a plurality of PV strings. Accordingly, the sensor data that is transmitted to the monitoring system 400 is associated with a plurality of PV strings.

Figure 4:
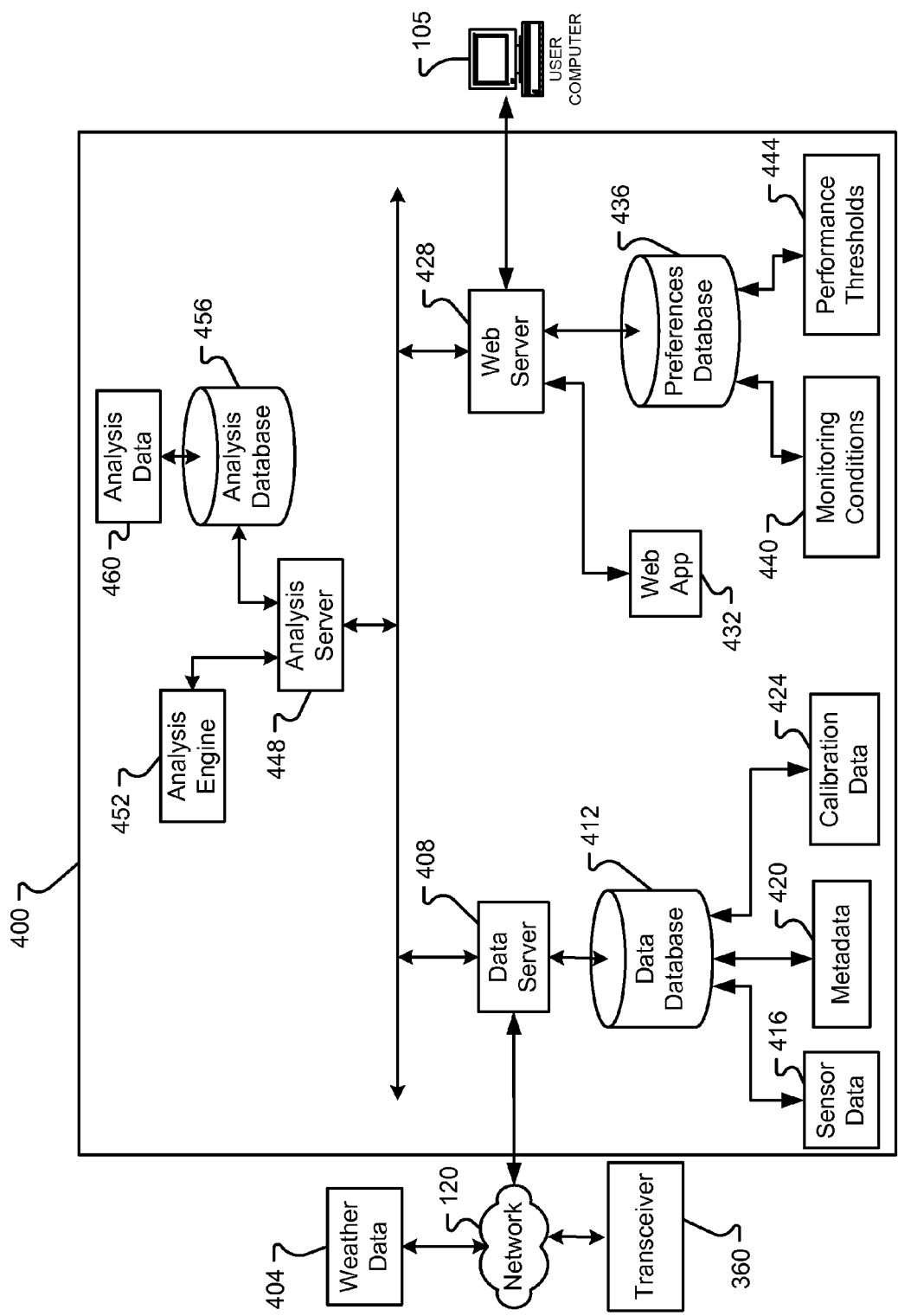
FIG. 4 is a block diagram of an embodiment of the monitoring system of the present disclosure.

FIG. 4 illustrates an embodiment of the monitoring system 400 discussed above in connection with FIG. 3. As shown in FIG. 4, the monitoring system 400 includes multiple servers and databases. The number and configuration of the servers and databases are shown for illustration purposes only, and may be altered without departing from the scope of the present disclosure. For example, a single server and database may be utilized. As depicted in FIG. 4, a data server 408 is in communication with a network 120 and receives sensor data from a transceiver 360. Optionally, the data server 408 may receive weather data 404. The weather data 404 may originate from a weather substation located at the PV system, and may include environmental conditions such as solar radiance, wind speed, wind direction, temperature, and humidity. Measuring the solar radiance, using a pyranometer, allows the monitoring system to evaluate the impact of smog, haze, or clouds on the performance of the PV system.

The data server 408 communicates with a data database 412, which stores sensor data 416, metadata 420, and calibration data 424. Sensor data 416 may be voltage data or current data, and may include instantaneous values as well as time-averaged data. Metadata 420 includes data associated with the sensor data, such as weather data, timestamp, combiner identification, inverter identification, sensor identification, and angle of the sun. Calibration data 424 includes the initial calibration data recorded when the system was first commissioned as well as periodic calibration data initiated by the monitoring system 400. The calibration data 424 is associated with the data channels.

The data server 408 also communicates with a web server 428. The web server 428 communicates with a user computer 105, a web application 432, and a preferences database 436. The web application 432 includes a user interface that allows a user to monitor the performance of a PV system, to set monitoring conditions 440, and to set performance thresholds 444. Additionally, the web application 432 may generate alerts notifying a user of performance issues.

The monitoring conditions 440 are intended to limit the analysis to periods of time when the PV system should be producing at least a minimum amount of power. At low power levels, measurement and other errors represent a larger contribution to the data than at higher power levels. Thus, by restricting the analysis to those times when the string power is above a preset threshold, the reliability of the monitoring system is improved. Monitoring conditions 440 include the time of day the monitoring system 400 will monitor the performance of the PV system 300, the position of the sun, geometric interference shading data, a minimum solar irradiation level, a minimum current or voltage level, and a minimum power level.

Performance thresholds 444 are used to detect an underperforming PV string. Performance thresholds 444 include a comparator and a deviation value. Comparators include a specification performance comparator, a statistical average performance comparator, a channel-to-channel comparator, and a time-differential comparator. A specification performance comparator comprises comparing the actual performance of a plurality of PV strings with the optimal performance of the strings. A statistical average performance comparator comprises comparing the actual performance of a plurality of PV strings with the statistical average performance of the strings, which may be determined during a testing phase of the PV array. A channel-to-channel comparator comprises comparing the actual performance of a plurality of PV strings with the actual performance of another plurality of PV strings. In some embodiments, a data entry received by one data channel may be compared to a data entries received from multiple other data channels. Additionally, in some embodiments, the channel-to-channel comparator may compare data entries associated with similar sun positions, even if the data entries were not detected at the same time or date. A time-differential comparator comprises comparing the actual performance of a plurality of PV strings with the performance of the plurality of PV strings at an earlier date. The time-differential comparator compares data entries associated with similar sun positions. For example, the time-differential comparator may compare a data entry associated with a plurality of PV strings with a data entry associated with the same plurality of PV strings but detected one year earlier. Shorter-term comparisons, such as daily comparisons, help the monitoring system quickly identify a failure whereas longer-term comparisons, such as yearly comparisons, help the monitoring system identify performance degradation issues that are hard to detect in shorter-term comparisons. A single performance threshold comparator, or any combination thereof, may be utilized. In at least one embodiment, a channel-to-channel comparator and a time-differential comparator are utilized. The deviation value comprises a percentage variance that the actual performance can vary from the comparator value. The deviation value includes a predefined percentage, a standard deviation value, or a production impact.

The monitoring conditions 440 and the performance thresholds 444 may be user-selectable. In one configuration, the user may set the conditions 440 and thresholds 444 via a web application 432. During development testing, a simulated run-time environment is provided that can execute the conditions and thresholds under a set of predefined conditions. The simulating development testing allows the user to test, debug and perfect the monitoring conditions and performance thresholds before deployment. The simulated run-time environment testing package is stored in a database for continued development and editing, thereby allowing a user to test new monitoring conditions and performance thresholds before entering them into the production web servers. Accordingly, a user may set the conditions and thresholds under which the monitoring system 400 will analyze the sensor data and monitor performance of the PV system. The conditions and thresholds may have predefined default values which will be used by the monitoring system 400 until a user overrides the default values by entering a user-selectable value.

An analysis server 448 is also provided in FIG. 4. The analysis server 448 communicates with the data server 408, the web server 428, as well as the analysis engine 452 and the analysis database 456. The analysis database 456 stores the analysis data 460, which includes the calculated angle of the sun at any moment in time and the geometric interference shading data associated with the PV system. The analysis engine 452 calculates the angle of the sun based on time of year, the time of day, and the latitude and longitude of the PV system. Using the angle of the sun, the analysis engine 452 can determine geometric interferences that will shade all or a portion of the PV system. The geometric interference shading data enables the analysis engine 452 to identify low performance as geometric interference shading rather than a failure or performance degradation. Additionally, the geometric interference data may be used as a monitoring condition to limit analysis of the portion of the PV system that is affected by the geometric interference shading.

Figure 5:
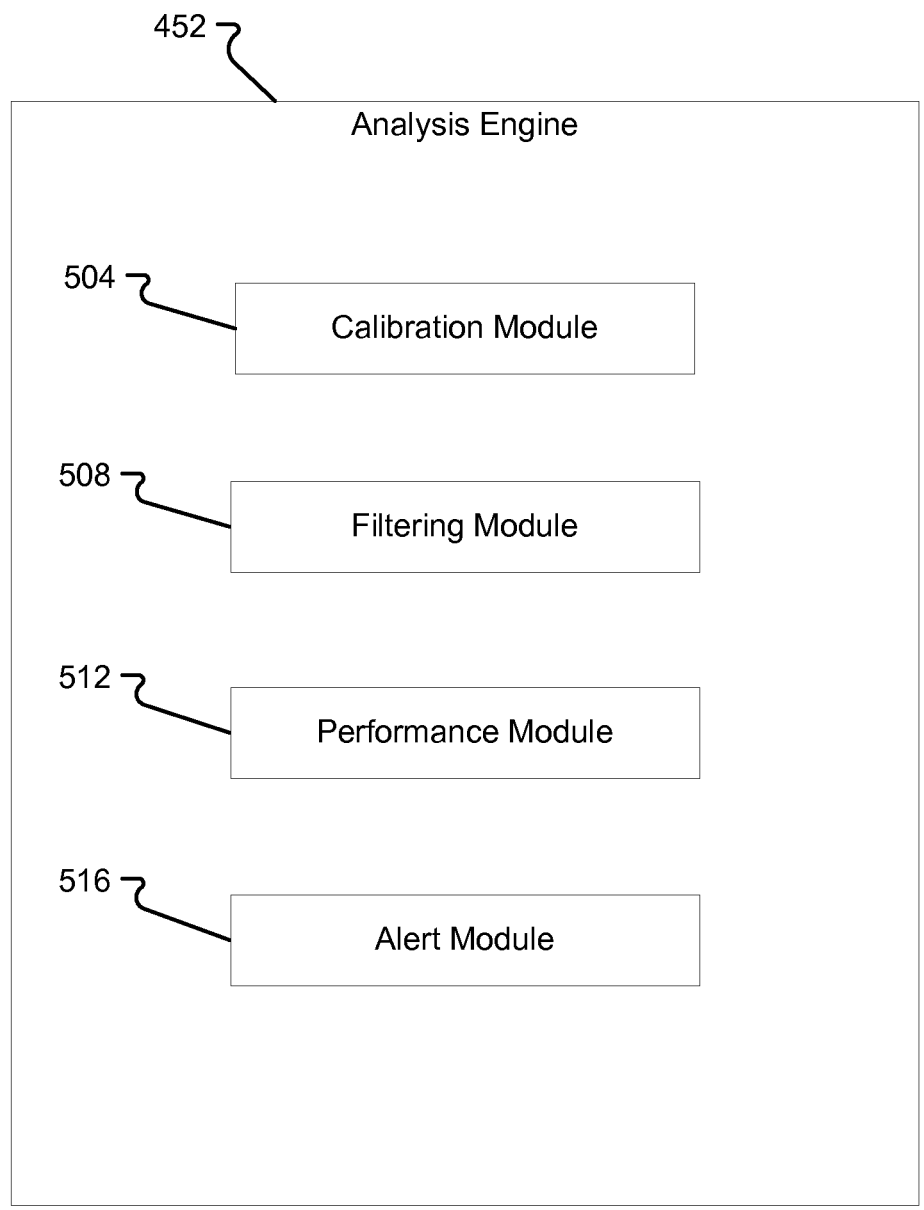
FIG. 5 is a block diagram of an embodiment of the analysis engine of FIG. 4.

Referring to FIG. 5, the analysis engine 452 is illustrated with a calibration module 504, a filtering module 508, a performance module 512, and an alert module 516. The calibration module 504 automatically calibrates the measurement hardware. The automatic calibration is initially performed when the system is first commissioned and all strings are confirmed to be operating, thus ensuring that a string failure is not mistakenly classified as a gain discrepancy. To eliminate the effect caused by differences in gain and offset for each sensor, samples are taken at night to determine the measurement offset and during periods of peak sunlight levels to determine the gain. The offset and gain factors are applied to the sensor data to normalize the data and remove the hardware effects. The calibration is limited by the accuracy ratings of the measurement hardware and the maximum differences due to panel performance variances. Calibration values outside of these limits indicate a failure or component that is out of specification. Besides an initial calibration, the calibration module also performs frequent calibration readings to verify the sensor hardware is still within specification and to compare the offset and gain values to the initial calibration values. Variances in calibration values may indicate a component failure or a PV string performance issue. For example, a dirty panel will not have as high of an output as a clean panel, even if exposed to the same amount of sunlight. Accordingly, in response to a dirty panel, the calibration module 504 may re-calibrate the sensor hardware to take into account the reduced output from the environmental condition. Also, the calibration module 504 may instruct the alert module 516 to generate an alert notifying the user that the sensor is out-of-specification and that the calibration module 504 has re-calibrated the sensor to limit further alerts. Without re-calibrating the equipment, the environmental condition would continue to generate alerts and may be flagged as a PV string failure.

The filtering module 508 limits the analysis to periods of time when the PV system should be producing at least a minimum amount of power. By restricting the analysis to those times when the string power is above a predetermined threshold, the monitoring system 400 will reduce unnecessary alerts that may be generated due to noise being a large contribution to the data. To filter the data, the filtering module 508 retrieves sensor data 416, metadata 420, and calibration data 424 from the data database 412, monitoring conditions 440 from the preferences database 436, and analysis data 460 from the analysis database 456.

The performance module 512 detects an underperforming PV string. To detect a failure or performance degradation, the performance module 512 retrieves performance thresholds 444 from the preferences database 436 and sensor data 416 from the data database 412. Then, the performance module 512 compares the sensor data 416 with the performance thresholds 444. If the data entry is not within the performance thresholds, the performance module informs the alert module that the data entry is in an alarm condition.

The alert module 516 monitors data channels with data entries in an alarm condition. If the channel remains in an alarm condition for a predetermined period of time, the alert module 516 generates an alert notifying a user of an issue with the data channel. The alert may contain sensor data, metadata, calibration data, analysis data, and the performance threshold. Additionally, the alert module 516 may generate varying levels of alerts. For example, the alert module 516 may include two alert levels, a failure level and a detection level, depending on the variance of the sensor data from the performance thresholds. A failure level alert would be sent to the user and state that a failure has occurred. A detection level alert would be sent to the user but would inform the user that the data channel is under investigation and that the monitoring system 400 will continue to monitor the channel over the next several days to determine whether there is a failure or performance degradation.

Figure 6:
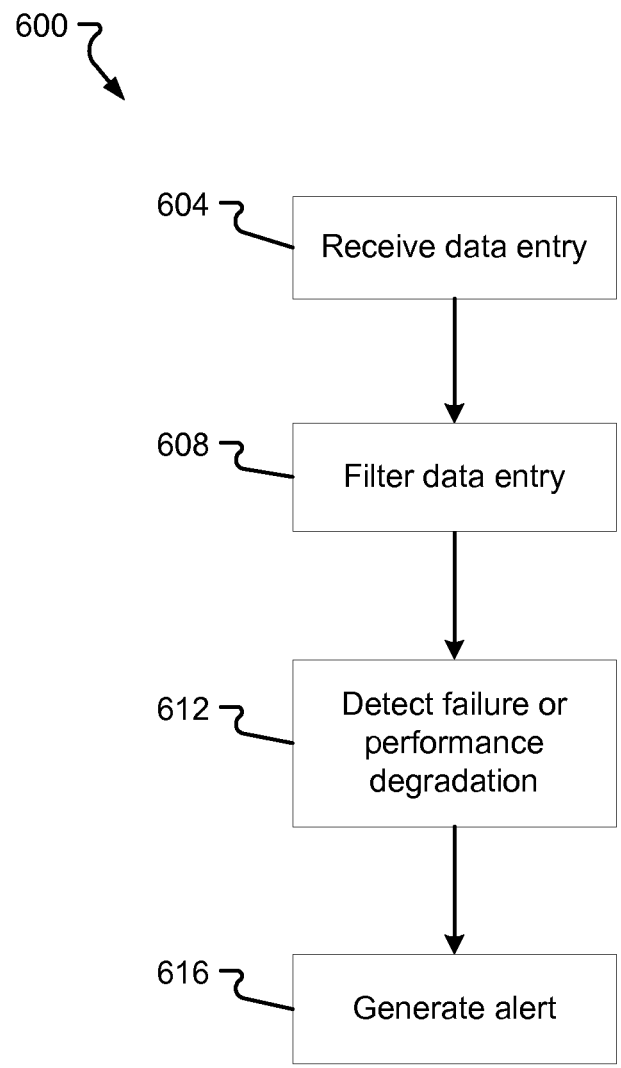
FIG. 6 is a flowchart of an embodiment of the monitoring method of the present disclosure.

Referring to FIG. 6, a simplified flow chart is provided of an embodiment of a monitoring method. The method or process as set forth in FIG. 6 is repeated for each data entry that is received by the monitoring system 400. At step 604, the monitoring method 600 receives a data entry from a sensor. The data entry is associated with a plurality of PV strings. Additionally, along with the data entry, the monitoring method 600 may receive weather data 404 and metadata 420 associated with the data entry. At step 608, the monitoring method 600 filters the data entry. This may be accomplished by comparing the data entry, along with its associated weather data and/or metadata, with monitoring conditions 440. If the data entry does not satisfy the monitoring conditions, then the monitoring method 600 will not analyze the data entry and will restart the process with another data entry. For example, if a monitoring condition instructs the method to only monitor performance between 9:00 am and 4:00 pm, the method would not analyze a data entry associated with a timestamp of 8:30 am. If the method determines that the monitoring conditions are satisfied, then the method analyzes the data entry to detect failures and/or performance degradation (step 612). This is accomplished by comparing the data entry to performance thresholds 444. As already discussed, the monitoring conditions and the performance thresholds may be user-selectable; however, in at least one embodiment, default conditions and thresholds are provided.

If the data entry is within the performance threshold, the method will stop monitoring the data entry and will restart the process with another data entry. If the data entry is not within the performance threshold, the method may generate an alert (step 616). Before generating an alert, the method checks the data channel to determine if the data channel associated with the data entry has been in an alert condition for a predetermined period of time. An alert time limit may be user-selectable, or a default value, and comprises a minimum time period that the data channel must be outside of the performance threshold before an alert is generated. If the data channel has been in an alert condition for greater than the predetermined alert time limit, the method generates an alert notifying the user of a failure and/or degraded performance associated with the data channel. If the data channel has not been in an alert condition for greater than the predetermined alert time, then the method records the data entry and data channel as being in an alert condition. Then, the method analyzes another data entry.

Figure 7:
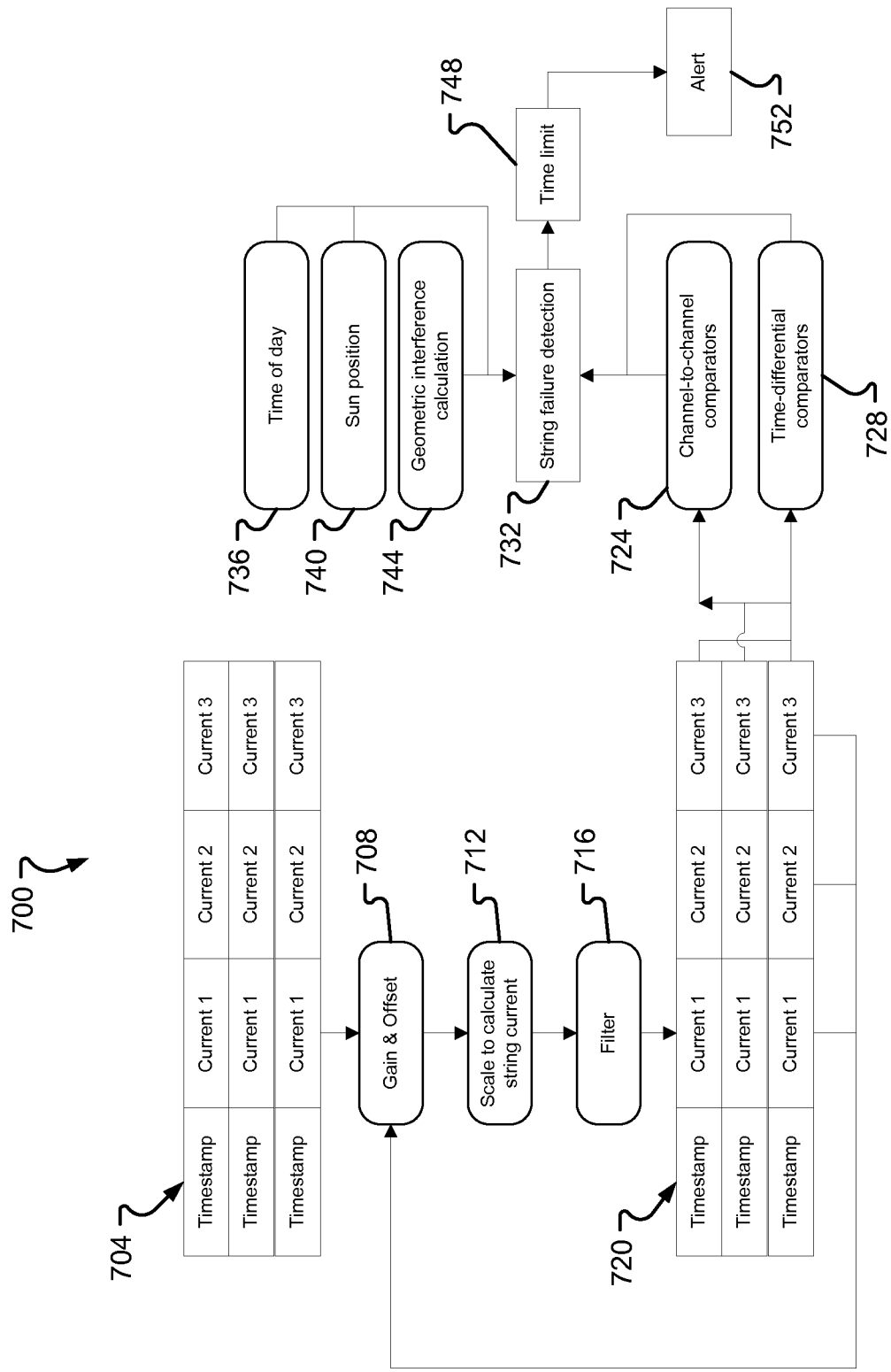
FIG. 7 is a flowchart of another embodiment of the monitoring method of the present disclosure.

Referring to FIG. 7, a simplified flow chart is provided of an embodiment of a monitoring method 700. The method or process as set forth in FIG. 7 is repeated during the course of monitoring the performance of a PV system. Generally, the method set forth in FIG. 7 comprises averaging data samples over time, auto-calibrating measurement hardware, qualifying performance measurements based on a calculated angle of the sun and/or on a minimum power threshold, comparing data between channels and between days and/or years, and generating qualified alerts.

At step 704, the monitoring method 700 receives raw data 704 from measurement hardware, such as a current sensor. The raw data may be received as individual data entries or, as shown in FIG. 7, the raw data may be received as groups of data entries. In FIG. 7, the raw data comprises a timestamp associated with current data from three sensors, a second timestamp associated with current data from the three sensors, and a third timestamp associated with current data from the three sensors. Additional data may be associated with the timestamp and data entries, such as weather data. The raw data 704 may be instantaneous data values, such as amperage, or a calculated average for each data channel over a period of time. In at least one embodiment, the instantaneous data samples are averaged over a time period of five to sixty minutes to eliminate transient effects from weather and other rapidly changing sources. This averaging reduces any relatively localized and temporary effect such as shadows due to clouds that may affect parts of the array differently. A standard low pass filter can be used to average the data samples, thus generating a data set over the course of each day that is not significantly skewed by transient effects.

At step 708, the raw data 704 is normalized by applying gain and offset factors. The gain and offset factors are initially determined when the system is first commissioned and all strings are confirmed to be operating so that a string failure is not mistakenly classified as a calibration discrepancy, and vice versa. During the course of operation, auto calibration is performed to ensure that the raw data 704 is properly normalized. Data samples are taken at night to determine the measurement offset and during periods of peak sunlight levels to determine the gain. The gain and offset values are compared to the initial calibration values. If the operational calibration levels are not within a predetermined percentage of the initial calibration levels, an alert may be generated notifying the user of a calibration issue with the measurement hardware. Until the issue is resolved, the system may utilize the operational gain and offset values during the performance monitoring to reduce further alerts. Monitoring the calibration data provides the monitoring system an additional mechanism to identify performance issues. For example, dirt on a string of panels will reduce the gain of that string. This reduced gain will be reflected in the calibration data. Thus, by monitoring the calibration data, the system can detect environmental conditions affecting the performance of the PV system. Also, by monitoring the calibration data, the system can detect component failures.

At step 712, the calibration values 708 are applied to the raw data 704 to calculate a normalized data entry, such as a string current 712. At step 716, the normalized data 712 is filtered. The filtering may include monitoring conditions, such as those discussed above. For example, a filter may include a minimum current or power threshold. In this example, data entries that do not satisfy the minimum current or power level would not be analyzed. In another example, a filter may include a time of day or position of the sun. In this example, the system calculates the angle of the sun at any moment in time based upon the time of day, the time of year, and the latitude and longitude of the PV system. By calculating the angle of the sun at any moment, the method can avoid attempting to detect string failures during those times when the sun is low in the sky. Additionally, the method can avoid attempting to detect string failures during those times when the angle of the sun is known to cause shadows and/or reflections that may affect the performance of a part of the array. This determination may be made for the entire array, or calculated to avoid specific regions of the array that may be affected by obstacles or other geometric concerns such as panels mounted at different angles. A geometric interference calculation may be performed based upon the angle of the sun, the physical layout of the array, and the obstacles at the array site.

At step 720, the normalized data 712 that has not been filtered in step 716 is stored as corrected data 720. The corrected data 720 may be re-calibrated and re-filtered if it is determined that there was an error in the calibration steps 708, 712 or the filtering step 716. After calibrating and filtering the data, the corrected data 720 is then compared to other data entries. The comparisons may include channel-to-channel comparators 724 and/or time-differential comparators 728. The channel-to-channel comparators 724 comprise comparing a data entry from a first data channel, such as current 1 in FIG. 7, with a data entry from a second data channel, such as current 2 in FIG. 7. The time-differential comparators 728 include comparing data between days and years. For example, comparisons at a given time of day between successive days or over the span of a few days provide a clear indication of sudden performance changes due to string failures. In addition to string failures, soiling, aging, and other changes over time may affect system performance differently across the array. By comparing performance between years, more subtle changes affecting performance may be detected. As auto-calibration will mask slowly changing performance differences, a year-to-year comparison may be performed using the initial set of calibration data. In some configurations, both the channel-to-channel comparators and time-differential comparators will be employed. In at least one embodiment, the channel-to-channel comparators 724 and the time-differential comparators 728 compare data entries that are associated with similar sun positions. For example, as the position of the sun varies by less than one-half degree per day, comparisons at a given time of day may be made over the span of a few days. As another example, comparisons may be made between a data entry and a previously stored data entry detected a year and two days earlier. In at least one embodiment, similar sun positions comprise sun angles within 5 degrees.

Step 732 is a string failure detection step. The string failure detection step 732 comprises determining if the data entry is within a performance threshold. In FIG. 7, the performance thresholds comprise a deviation from both a channel-to-channel comparator 724 and a time-differential comparator 728. The deviation values may be default values or user-defined values. The string failure detection step 732 also considers the time of day 736, the sun position 740, and the geometric interference calculations 744 in determining whether to generate an alert. These features have been discussed above in connection with the filtering step 716. If the string failure detection step 732 determines that the data entry is not within a performance threshold and that a time of day 732, a sun position 740, or a geometric interference 744 is not the cause, the string failure detection step 732 sets the data channel associated with the data entry in an alarm condition. In this discussion, the time of day, the sun position, and the geometric interference calculation are discussed in connection with both the filtering step 716 and the string failure detection step 732. However, these features may be provided in connection with only the filtering step 716, only the string failure detection step 732, both the filtering step 716 and the string failure detection step 732, or any combination thereof.

At step 748, the method 700 determines if the data channel has been in an alarm condition for a predetermined time period. The period may be user-defined or a default value. If the data channel has not been in an alarm condition for a predetermined time period, then the monitoring method 700 continues to monitor the PV system without generating an alert. If the data channel has been in an alarm condition for a predetermined time period, then the method 700 generates an alert notifying the user of the underperforming data channel (step 752). As discussed earlier, the alert may comprise different levels. Additionally, the alert may be provided in different forms such as an email, a text message, a phone message, a printed report, or a user interface screen provided in a web application.

Although FIGS. 6 and 7 shows a single path, sequential process, it shall be understood that a number of the steps may be performed in a different order than that described. For example, a number of the steps in the method can be conducted simultaneously in order to efficiently monitor the performance of the PV system and timely generate alerts notifying a user of an underperforming data channel.

Figure 8:
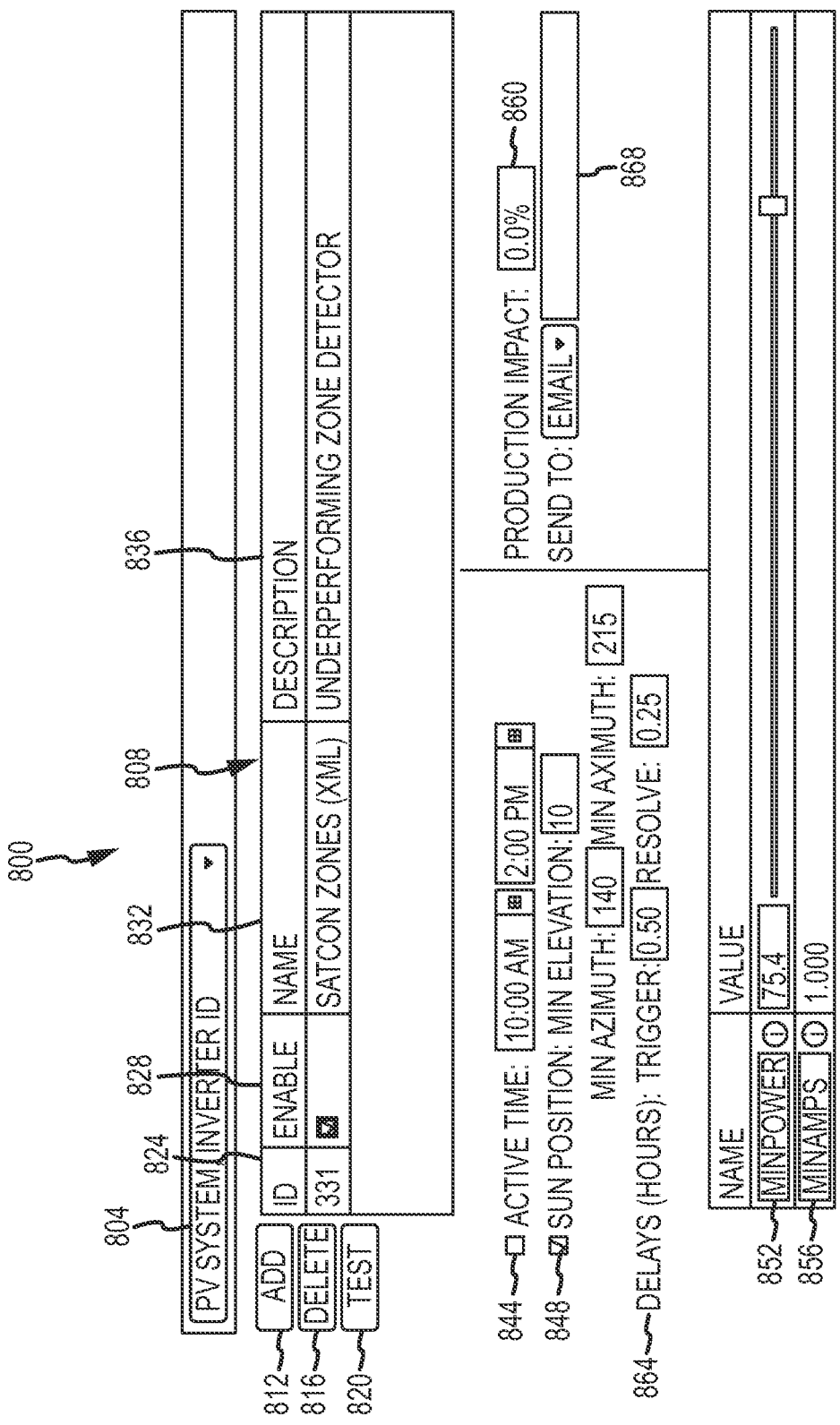
FIG. 8 is a sample user interface screen illustrating an alert setup screen.

Referring to FIG. 8, a sample user interface screen is provided illustrating an alert setup screen 800. In at least one embodiment, the user interface screen is accessible to users via a web application. Screen 800 provides a user-selectable hardware menu 804. The menu 804 contains a list of hardware options, including the PV system and inverter identifications. The screen 800 also contains a measurement hardware section 808. This section 808 allows a user to add 812, delete 816, and test 820 data channels. After adding a data channel, the data channel identification 824, name 832, and description 836 is displayed. The description 836 summarizes any performance issues associated with the channel. Additionally, the user can enable or disable monitoring of the channel by selecting or unselecting the enable option 828.

The alert setup screen 800 also contains a user parameter section 840. In this section 840, the user can set the time of day 844 and the sun position 848 for the channel to be monitored. The sun position 848 includes a minimum elevation, a minimum azimuth, and a maximum azimuth. Additionally, the user may select a minimum power 852 and a minimum amperage level 856. If the data channel is below these values, the system will not monitor the data channel. Further, the user may set a production impact 860 and an alert delay 864. The production impact 860 represents a percentage that the performance of the PV array must be impacted before an alert would be generated. This threshold is especially applicable for periods of time during which operators would be paid overtime to investigate a performance issue. Thus, to reduce operating costs, the user could set the production impact value based upon a cost balancing, i.e., the cost of a reduced power output versus the cost of overtime pay. For example, the production impact may be set around two percent for larger PV systems and around ten percent for smaller PV systems. Any percentage could be set, and ultimately would be at the discretion of the user. The alert setup screen 800 also allows the user to enter the preferred method to receive an alert, such as by email 868. For a system containing 100 strings, a production impact of 1% may be used to calculate the effect of a string failure on overall system output.

Figure 9:
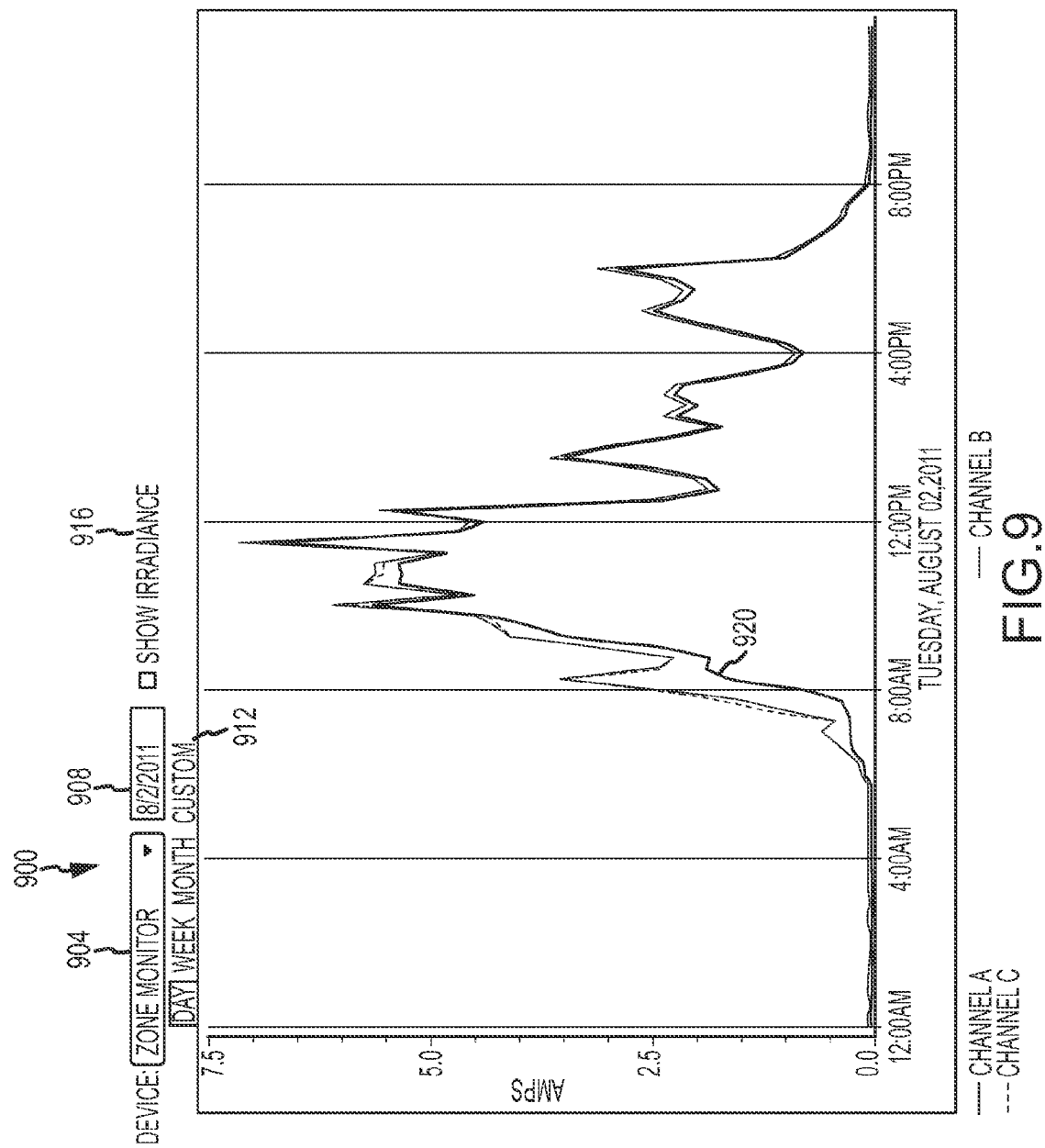
FIG. 9 is a sample user interface screen illustrating PV data in a graphical format.

Referring to FIG. 9, a sample user interface screen 900 is provided illustrating PV performance data in a graphical format. The screen 900 allows the user to select a monitoring device 904, such as an inverter, a date 908, and a time format 912, such as a day, a week, a month, or custom. Additionally, the screen 900 allows a user to graph irradiance data 916. In FIG. 9, the screen 900 illustrates the amperage output of three data channels during the course of one day. Each data channel is associated with a plurality of PV strings. As illustrated, one data channel 920 underperformed the other two data channels from approximately six o'clock a.m. to ten o'clock a.m. This screen 900 allows the user to visually see underperforming channels.

Figure 10:
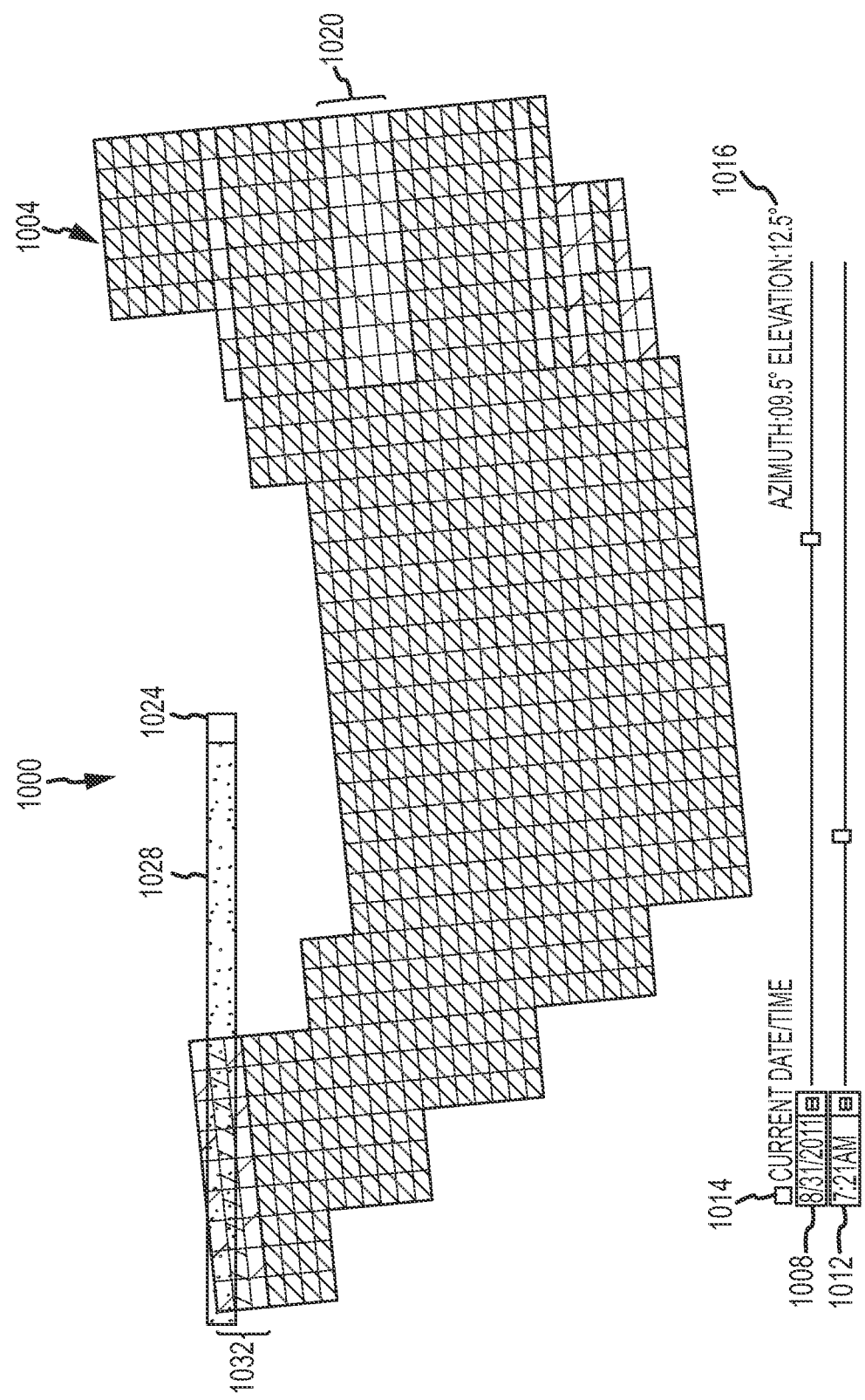
FIG. 10 is a sample user interface screen illustrating performance of a plurality of PV strings along with geometric interference shading effects.

Referring to FIG. 10, a sample user interface screen 1000 is provided illustrating a PV array layout. The screen 1000 depicts the performance of a PV array 1004 and provides a user an immediate visual representation of the exact location of underperforming PV strings. Each string can be identified by the user, for example, by a mouse roll-over feature in which the coordinates of each string or any other type of identifying description is displayed. The screen 1000 allows the user to review the performance of a PV array at any moment in time by providing options to select a date 1008 and a time 1012 associated with the performance data, including an option 1014 to view the real-time performance of the PV array. The screen 1000 also displays the sun position 1016, including azimuth and elevation, associated with the performance data. A video option may be provided allowing the user to view the performance of a PV array over a period of time. In FIG. 10, a PV array 1004 is illustrated in which the performance of PV strings is differentiated by color. In one embodiment, a color scheme may comprise green, yellow, red, and combinations thereof. For example, PV strings 1020 are underperforming and thus are displayed in a yellowish color. By providing the user a visual depiction of the performance of PV strings within a PV array, screen 1000 allows the user to quickly determine the location of possible failures or performance degradation. This helps reduce troubleshooting costs by allowing the user to focus on a specific location within the PV array. Additionally, in FIG. 10, the screen 1000 illustrates the effects of geometric interference shading on the performance of the PV array. As illustrated, a windmill 1024 is located near the PV array 1004. Based on the position of the sun 1016, the screen 1000 displays a shadow 1028 created by the windmill 1024. As shown, the shadow 1028 is cast over PV strings 1032, thus affecting their performance. By using screen 1000, the user can quickly determine that the underperformance of strings 1032 is caused, at least in part, by the shadow 1028 created by the windmill 1024. Accordingly, the user can divert their attention to other areas of the array that are underperforming. Other performance depiction schemes, beyond colors, may be utilized. The shading simulation can be used to identify times of the day and year when certain parts of the array will underperform. This information can prevent alerts from being generated that would otherwise appear as a string failure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate embodiment of the disclosure.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. While the present disclosure has been discussed with respect to various embodiments, it shall be understood that various other changes and modifications to the disclosure can be made in accordance with the scope of the claims appended hereto.

What is claimed is:

1. A system for monitoring performance of a photovoltaic array, the system comprising:
    a photovoltaic system comprising:
        a photovoltaic string for converting sunlight into electrical energy;
        a combiner for combining the output signals of a plurality of photovoltaic strings;
        an inverter for converting the DC output signals of a plurality of combiners into AC power; and
        a sensor for detecting data associated with a plurality of photovoltaic strings;
    a monitoring system for monitoring the performance of a photovoltaic array, comprising:
        a memory;
        a processor in connection with the memory, the processor operable to execute software modules, the software modules comprising:
            a filtering module operable to determine if a data entry should be monitored based upon monitoring conditions, wherein the data entry is associated with a plurality of photovoltaic strings;
            a performance module operable to compare the data entry with a performance threshold; and
            an alert module operable to generate an alert associated with the data entry; and
        a web application operable to receive user-selectable monitoring conditions and to display performance data associated with the data entry.

2. The system of claim 1, wherein the monitoring conditions comprise a sun position consisting of a minimum elevation, a minimum azimuth, and a maximum azimuth.

3. The system of claim 1, wherein the performance threshold comprises at least one of a channel-to-channel comparator or a time-differential comparator.

4. The system of claim 3, wherein the time-differential comparator comprises comparing the data entry with a previously stored data entry associated with the plurality of photovoltaic strings, wherein the previously stored data entry was detected at least one day prior to the data entry.

5. The system of claim 4, wherein the time-differential comparator further comprises comparing the data entry with a previously stored data entry associated with the plurality of photovoltaic strings, wherein the previously stored data entry was detected at least one year prior to the data entry.

6. The system of claim 1, wherein the monitoring system further comprises a calibration module operable to detect a non-calibrated component and to automatically recalibrate the component.

7. The system of claim 1, wherein the performance threshold comprises a production impact.

8. The system of claim 1, wherein the display comprises a photovoltaic array layout indicating the performance of a plurality of photovoltaic strings.

9. A method of monitoring performance of a photovoltaic array, the method comprising:
    providing a photovoltaic system comprising:
        a photovoltaic string for converting sunlight into electrical energy;
        a combiner for combining the output signals of a plurality of photovoltaic strings;
        an inverter for converting the DC output signals of a plurality of combiners into AC power; and
        a sensor for detecting data associated with a plurality of photovoltaic strings;
    receiving a data entry associated with a plurality of photovoltaic strings;
    determining, via a processor, whether the data entry should be analyzed based upon monitoring conditions;
    determining, via a processor, if the data entry is within a performance threshold comprising at least one of a channel-to-channel comparison or a time-differential comparison;
    in response to a determination that the data entry should be analyzed and that the data entry is not within the performance threshold, determining, via a processor, if the data entry has been in an alarm condition for a predetermined period of time; and
    in response to a determination that the data entry has been in an alarm condition for a predetermined period of time, generating an alert in the form of at least one of a user interface, a printed report, a text message, or an email message.

10. The method of claim 9, wherein the monitoring conditions comprise a sun position consisting of a minimum elevation, a minimum azimuth, and a maximum azimuth.

11. The method of claim 9, wherein the time-differential comparison comprises comparing the data entry with a previously stored data entry associated with the plurality of photovoltaic strings, wherein the previously stored data entry was detected at least one day prior to the data entry.

12. The method of claim 11, wherein the time-differential comparison further comprises comparing the data entry with a previously stored data entry associated with the plurality of photovoltaic strings, wherein the previously stored data entry was detected at least one year prior to the data entry.

13. The method of claim 9, wherein the channel-to-channel comparison comprises comparing the data entry with a plurality of data entries each detected by a different sensor.

14. The method of claim 9, further comprising calculating, via a processor, the angle of the sun at any moment in time along with geometric interferences.

15. A non-transitory computer-readable medium containing computer executable instructions, wherein, when executed by a processor, the instructions cause the processor to execute a method for monitoring performance of a photovoltaic array, the computer-readable instructions comprising:
    instructions to determine if the data entry should be analyzed based upon monitoring conditions, wherein the data entry is associated with a plurality of photovoltaic strings;
    instructions to determine if the data entry is within a performance threshold comprising at least one of a channel-to-channel comparison or a time-differential comparison;
    in response to a determination that the data entry should be analyzed and that the data entry is not within the performance threshold, instructions to determine if the data entry has been in an alarm condition for a predetermined period of time;

in response to a determination that the data entry has been in an alarm condition for a predetermined period of time, instructions to generate an alert in the form of at least one of a user interface, a printed report, a text message, or an email message.

16. The computer-readable medium of claim 15, wherein the monitoring conditions comprise a sun position consisting of a minimum elevation, a minimum azimuth, and a maximum azimuth.

17. The computer-readable medium of claim 15, wherein the monitoring conditions comprise geometric interference shading data.

18. The computer-readable medium of claim 15, wherein the time-differential comparison comprises comparing the data entry with a previously stored data entry associated with the plurality of photovoltaic strings, wherein the previously stored data entry was detected at least one day prior to the data entry.

19. The computer-readable medium of claim 18, wherein the time-differential comparison further comprises comparing the data entry with a previously stored data entry associated with the plurality of photovoltaic strings, wherein the previously stored data entry was detected at least one year prior to the data entry.

20. The computer-readable medium of claim 15, further comprising instructions to detect a non-calibrated component and automatically recalibrate the component.

* * * * *